(12) United States Patent
Burgmeier et al.

(10) Patent No.: US 9,338,595 B1
(45) Date of Patent: *May 10, 2016

(54) LOCATION-BASED MOBILE OBJECT MANAGEMENT IN A DISTRIBUTED CLOUD FOR ENHANCING ACCESS AND PERFORMANCE

(71) Applicant: International Business Machines Corporation, Armonk, NY (US)

(72) Inventors: Amanda Y. Burgmeier, Austin, TX (US); Su Liu, Austin, TX (US); Robert W. Thompson, Austin, TX (US); Shunguo Yan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/628,503

(22) Filed: Feb. 23, 2015

(51) Int. Cl.
- *H04W 24/00* (2009.01)
- *H04W 4/02* (2009.01)
- *H04W 36/14* (2009.01)
- *H04W 36/32* (2009.01)

(52) U.S. Cl.
CPC ............... *H04W 4/02* (2013.01); *H04W 36/14* (2013.01); *H04W 36/32* (2013.01)

(58) Field of Classification Search
None
See application file for complete search history.

(56) References Cited

U.S. PATENT DOCUMENTS 7,383,310 B1 * 6/2008 Lyle .................... G06Q 10/107
709/204

2013/0073670 A1 * 3/2013 Das ...................... G06F 9/5027
709/217
2013/0144978 A1 6/2013 Jain et al.
2014/0188804 A1 * 7/2014 Gokhale ............. G06F 21/6218
707/645

OTHER PUBLICATIONS

Anonymous, "Location aware resource migration," An IP.com Prior Art Database Technical Disclosure, May 16, 2012, p. 1-2, IP.com Number: IPCOM000218045D.

Mclaughlin et al., "Relocation of Cloud Resources Based on Geo-Location of Connected Endpoints," An IP.com Prior Art Database Technical Disclosure, May 3, 2012, p. 1-3, IP.com Number: IPCOM000217131D, Cisco Systems, Inc.

Mell et al., "The NIST Definition of Cloud Computing," National Institute of Standards and Technology, Information Technology Laboratory, Oct. 7, 2009, Version 15.

(Continued)

*Primary Examiner* — Adolf Dsouza
(74) *Attorney, Agent, or Firm* — Patricia B. Feighan; Parashos Kalaitzis

(57) ABSTRACT

A method for location-based service migration is provided. The method may include monitoring, by a processor, a location of a mobile device. The method may also include checking the location against a geo-location profile, whereby the geo-location profile includes at least one of a service, a plurality of migration rules, a plurality of data, an application, a security, and a plurality of access frequency criteria. The method may further include transferring the at least one service and a plurality of data objects used by the at least one service from a first server with a server location outside a bounds for the location to a second server within a bounds for the location in response to detecting a service in the geo-location profile meets a migration criteria.

13 Claims, 6 Drawing Sheets

(56) References Cited

OTHER PUBLICATIONS

Millward, "Google Drive Already Blocked in China, Never Stood a Chance," Tech in Asia, Apr 25, 2012, p. 1, https://www.techinasia.com/google-drive-blocked-in-china/, Accessed on: Jan. 8, 2015.

Tjernlund, "The Remarkable Growth of Swift- and What it Means in 2014 (and Beyond)," SwiftStack Blog, Jan. 14, 2014, p. 1-4, https://swiftstack.com/blog/2014/01/14/The-remarkable-growth-of-Swift-and-what-it-means-in-2014-and-beyond/, Accessed on: Jan. 8, 2015.

Wikipedia, "Notification Center," Wikipedia, the Free Encyclopedia, Last Modified on Nov. 8, 2014, p. 1-2, http://en.wikipedia.org/wiki/Notification_Center, Accessed on: Dec. 18, 2014.

IBM, "List of IBM Patents or Patent Applications Treated as Related (Appendix P)," Jun. 12, 2015, p. 1-2.

Burgmeier et al., "Location-Based Mobile Object Management in a Distributed Cloud for Enhancing Access and Performance," filed Jun. 12, 2015, p. 1-31, U.S. Appl. No. 14/737,661.

* cited by examiner

LOCATION-BASED MOBILE OBJECT MANAGEMENT IN A DISTRIBUTED CLOUD FOR ENHANCING ACCESS AND PERFORMANCE

BACKGROUND

The present invention relates generally to the field of computers, and more particularly to mobile services.

A mobile service typically integrates data, metadata, personalized configuration, data center information, client information and a set of applications into a single object for information exchange and collection purposes. For instance, Apple Push Notification Service® (APNs®) (APNs® and all APNs®—based trademarks and logos are trademarks or registered trademarks of Apple, Inc. and/or its affiliates) is an example of a mobile service where subscripted users can receive push notifications through a notification center on the user's mobile device in real time. As such, the APNs® may forward notifications of third party applications to the Apple® devices. Such notifications may include sounds or custom text alerts.

Today, more people have started to use mobile object related services every day. Therefore, the mobile object related service market is increasing dramatically. However, there are some limitations for using mobile objects across the world. For example, geo-location issues is one major limitation of mobile objects. In many countries (Indonesia, Brazil, EU, China), local data server requirements mandate the use of a server infrastructure within the borders of a country, rather than allowing businesses flexibility to determine the most secure, reliable and economically effective locations for servers. In addition, many countries (e.g. Turkey, China) have a national firewall or related regulation to filter, verify, and block personal internet access. As such, some mobile services cannot be accessed in China due to the firewall. For example, some QQ® mobile services (QQ® and all QQ®—based trademarks and logos are trademarks or registered trademarks of Tencent Holdings Limited and/or its affiliates) are often not accessible from the Unities States.

SUMMARY

According to one embodiment, a method for location-based service migration is provided. The method may include monitoring, by a processor, a location of a mobile device. The method may also include checking the location against a geo-location profile, whereby the geo-location profile includes at least one of a service, a plurality of migration rules, a plurality of data, an application, a security, and a plurality of access frequency criteria. The method may further include transferring the at least one service and a plurality of data objects used by the at least one service from a first server with a server location outside a bounds for the location to a second server within a bounds for the location in response to detecting a service in the geo-location profile meets a migration criteria.

According to another embodiment, a computer system for location-based service migration is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include monitoring, by a processor, a location of a mobile device. The method may also include checking the location against a geo-location profile, whereby the geo-location profile includes at least one of a service, a plurality of migration rules, a plurality of data, an application, a security, and a plurality of access frequency criteria. The method may further include transferring the at least one service and a plurality of data objects used by the at least one service from a first server with a server location outside a bounds for the location to a second server within a bounds for the location in response to detecting a service in the geo-location profile meets a migration criteria.

According to yet another embodiment, a computer program product for location-based service migration is provided. The computer program product may include one or more computer-readable storage devices and program instructions stored on at least one of the one or me tangible storage devices, the program instructions executable by a processor. The computer program product may include program instructions to monitor, by a processor, a location of a mobile device. The computer program product may also include program instructions to check the location against a geo-location profile, whereby the geo-location profile includes at least one of a service, a plurality of migration rules, a plurality of data, an application, a security, and a plurality of access frequency criteria. The computer program product may further include program instructions to transfer the at least one service and a plurality of data objects used by the at least one service from a first server with a server location outside a bounds for the location to a second server within a bounds for the location in response to detecting a service in the geo-location profile meets a migration criteria.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
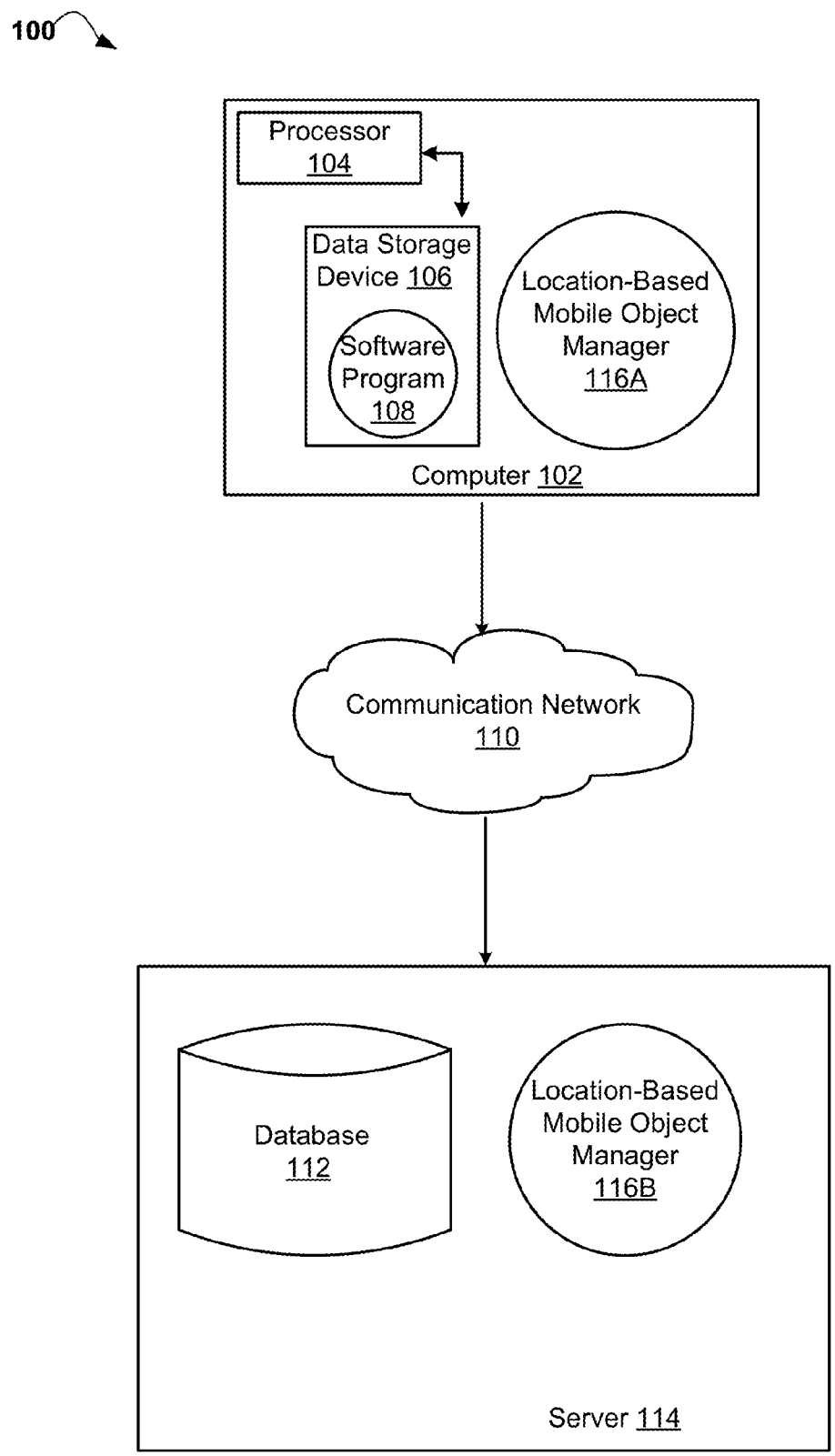
FIG. 1 illustrates a networked computer environment according to one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Embodiments of the present invention relate generally to the field of computers, and more particularly to mobile services. The following described exemplary embodiments provide a system, method and program product to, among other things, provide location-based mobile object management in a distributed cloud. Therefore, the present embodiment has the capacity to improve the technical field of data object management by providing the capability to have location-based mobile object management in a distributed cloud. More specifically, a user of a mobile service that utilizes location-based mobile objects may experience enhanced access and performance of the mobile service when using a mobile application.

As previously described, many people have started to use mobile object related services every day. However, there are some limitations for using mobile objects across the world. For instance, geo-location issues may be a major limitation on mobile objects. In many countries, local data server requirements mandate the use of a server infrastructure within the borders of a country, rather than allowing businesses flexibility to determine the most secure, reliable and economically effective locations for servers. In addition, many countries have a national firewall or related regulation to filter, verify, and block personal internet access. As such, some mobile services cannot be accessed due to the firewall in some countries.

Any such kind of limits and regulations may directly impact a mobile object's accessibility and performance. Therefore, performance and national regulations are major limitations on mobile object services. In addition, a mobile application typically uses services, such as push notification, hosted in a mobile cloud. The mobile services often synchronize metadata, such as location, task, and other activities, with user devices. However, the geo-location and firewall issues may slow the application or even block application to use the services.

Therefore, in order to solve such problems, may mobile service providers may assign a default geo-location to a user based on the user's profile. As such, some of the providers may give a user options to allow the user to select a geographic region where the user's data will reside for reducing costs and speed-up access or satisfy local requirements (e.g. Google Drive® (Google Drive® and all Google Drive®—based trademarks and logos are trademarks or registered trademarks of Google and/or its affiliates)). Google Drive® is a file storage and synchronization service created and managed by Google. It allows users to store documents in the cloud, share files, and edit documents with collaborators.

However such static selections do not address performance issues if large data transfer is involved. Additionally, such static selections do not address issues related to a national firewall if a user travels from one geo-location to another, and crosses a national firewall. For example, a user may have created a mobile object service account from the U.S., and configured his account and subscriptions for accessing all his mobile objects (document, messages, photos, and videos). However, after arriving to Beijing for a business trip, the user may find that all of their mobile object services are very slow or even not available in Beijing because the location of his object service server is in the U.S. As such, it may be advantageous, among other things, to define a method to dynamically comply with related national regulations, and automatically transfer selected user mobile objects into a cloud data center located in the current geo-location of the user before the user accesses them.

The major difference of the present embodiment from traditional distributed storage is the nature of the object. In a distributed storage, only user data is replicated, while for a mobile service in a cloud, not only the data, but the transaction stages (e.g., game) and programs need to be transferred for a service to run in a different node of the cloud.

The present embodiment may monitor a location of a mobile device and compare it with a geo-location profile whereby the profile contains service, migration rules, data, application, security, and access frequency criteria. Additionally, the present embodiment may transfer the service and data objects used by the service from a first server distant from the location to a second server close to the location in response to detecting a service in the geo-location profile meeting migration criteria. As such, the service is checked for compliance with national laws (of firewalls) associated with the second server.

According to at least one implementation, the present embodiment may provide a method to automatically transfer a set of service objects to the closest node in a cloud based on user's location. Once the location changes, the data, transaction stage, and programs that are required to run, restore, and continue the service are analyzed and packaged for a continuous operation in a new node. A copy is also sent to the master node for synchronization. The present embodiment may include a user predefined mobile object transformation profile, a user geo-location detection agent, a user mobile object classifier, and a mobile object transferring daemon. The user mobile object classifier will monitor user mobile objects accessing activities and classify mobile objects which will be most likely accessed in the future based on predefined rules. The user geo-location detection agent will track user geo-location changes. Therefore, if the user geo-location detection agent detects the user is close to another mobile object server, then it will trigger the mobile object transferring daemon to move the selected mobile objects to a new server before the user accesses them.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product to provide location-based mobile object management in a distributed cloud.

According to at least one implementation, the present embodiment may provide location-based service migration. The location-based service migration may include the monitoring of the location of a mobile device and checking the location against a geo-location profile whereby the profile may contain service, migration rules, data, application, security, and access frequency criteria. Additionally, responsive to detecting a service in the geo-location profile meeting a migration criteria, the present embodiment may transfer the service and data objects used by the service from a first server with a server location outside a bounds for the location to a second server within a bounds for the location. The bounds for the second server has a regional bound and rules for the regional bound. As a result, a transaction of the service is migrated seamlessly from the first server to the second server. Furthermore, the geo-location profile may identify rules allowing tailored options selected from a group consisting of size, type frequency usage, confidentiality, content, location sensitivity, regulations, data encryption rules, sensitive key words, confidential classification, and etc.

As such, the present embodiment may include four key components: a user predefined mobile object transformation profile, a user geo-location detection agent, a mobile object transferring daemon, and a user mobile object classifier. The user predefined mobile object transformation profile is a set of pre-defined rules and regulations on different geo-locations for the user mobile object transformation. The user geo-location detection agent provides one or more real-time modules for geo-location detection and destination prediction. Therefore, the user geo-location detection agent will track user geo-location changes. For example, if the user geo-location detection agent detects the user is close to another mobile object server, then it will trigger the mobile object transferring daemon to move the selected mobile objects to a new server before the user accesses them. As such, the object transferring daemon, complying with predefined rules and regulations, will transfer the correct mobile objects to a closest server in geo-location. The user mobile object classifier will monitor user mobile object accessing activities and classify mobile objects which will be most likely accessed in the future based on predefined rules.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a Location-Based Mobile Object Manager 116A. The networked computer environment 100 may also include a server 114 that is enabled to run a Location-Based Mobile Object Manager 116B that may interact with a database 112 and a communication network 110. The networked computer environment 100 may include a plurality of computer 102 and servers 114, only one of which is shown. The communication network may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the Location-Based Mobile Object Manager 116B running on server computer 114 via the communications network 110. The communications network 110 may include connections, such as wire, wireless communication links, or fiber optic cables. As will be discussed with reference to FIG. 4, server computer 114 may include internal components 800a and external components 900a, respectively, and client computer 102 may include internal components 800b and external components 900b, respectively. Client computer 102 may be, for example, a mobile device, a telephone, a personal digital assistant, a netbook, a laptop computer, a tablet computer, a desktop computer, or any type of computing devices capable of running a program, accessing a network, and accessing a database 112. According to various implementations of the present embodiment, the Location-Based Mobile Object Manager 116A, 116B may interact with a database 112 that may be embedded in various storage devices, such as, but not limited to a computer/mobile device 102, a networked server 114, or a cloud storage service.

As previously described, the client computer 102 may access the Location-Based Mobile Object Manager 116B, running on server computer 114 via the communications network 110. For example, a user using a client computer device 102 may create a mobile objects account with pre-defined mobile object transferring rules in the U.S. Additionally, the user may have configured their important business related mobile objects, such as presentation slides or flash video slides of their products. As such, the Location-Based Mobile Object Manager 116A, 116B may classify the user's mobile objects and data everyday based on the user's preferences. As previously described, the Location-Based Mobile Object Manager 116A, 116B may automatically transfer the set of service objects (i.e., the user's mobile objects and data) to the closest node in a cloud based on a user's location. For example, if the user arrives in a new location, such as Beijing for a business trip, the Location-Based Mobile Object Manager 116A, 116B may detect that the user is in a new geo-location and as such, may transfer the user's most recently used mobile objects from a primary server 114 in the U.S. to a new server in Beijing. The Location-Based Mobile Object Manager method is explained in more detail below with respect to FIGS. 2-3.

Figure 2:
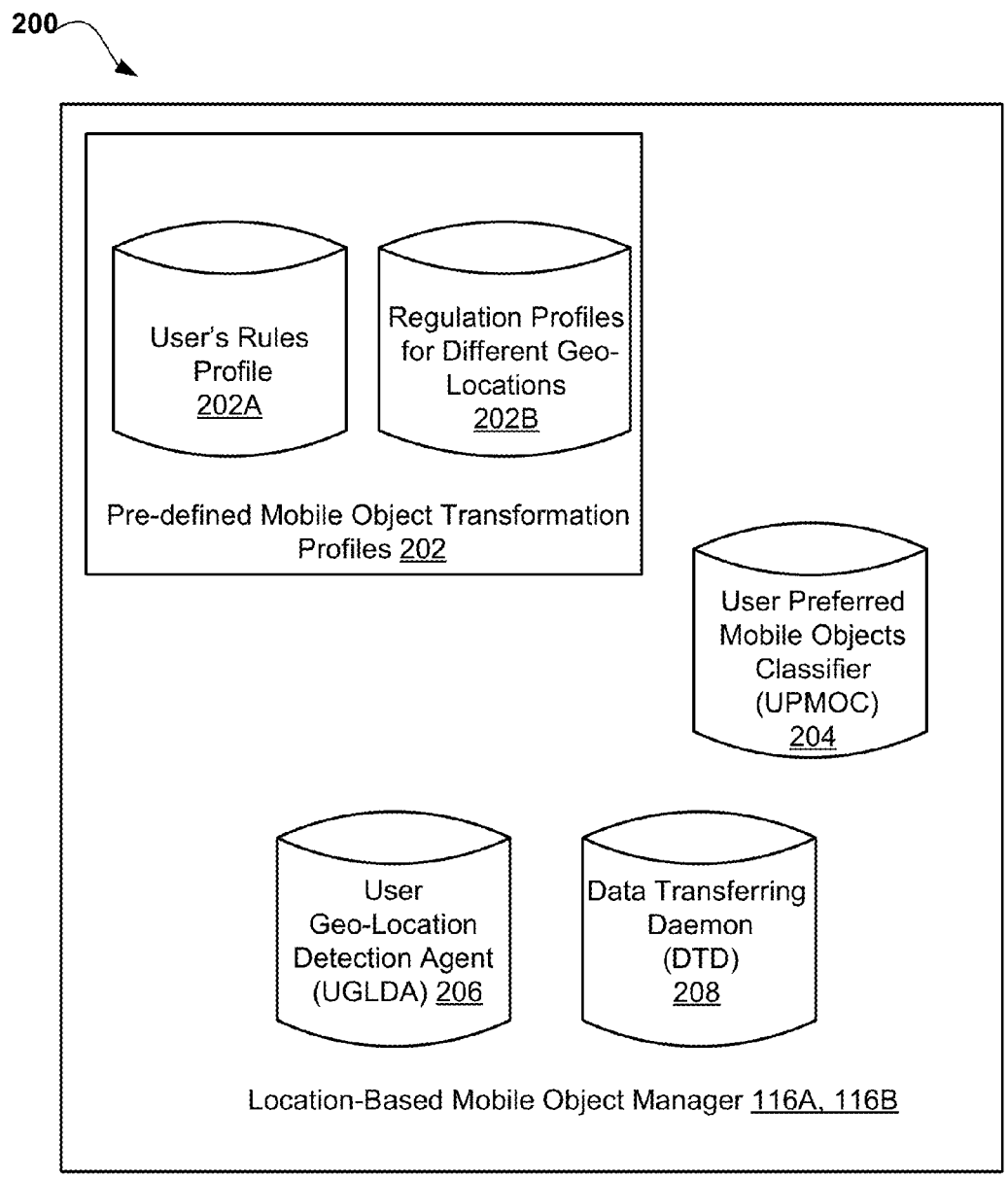
FIG. 2 is an exemplary illustration of the components and algorithms associated with the Location-Based Mobile Object Manager according to at least one embodiment.

Referring now to FIG. 2, an exemplary illustration 200 of the components and algorithms associated with the Location-Based Mobile Object Manager 116A, 116B in accordance with one embodiment is depicted. The Location-Based Mobile Object Manager 116A, 116B may include Pre-defined Mobile Object Transformation Profiles 202. The Pre-defined Mobile Object Transformation Profiles 202 may include a User's Profile 202A and a Regulation Profiles for Different Geo-Locations 202B. The User's Profile 202A is a set of pre-defined rules for user mobile object transformation. The predefined rules may include size, type, frequency usage, confidentiality, content, location sensitivity etc. The Regulation Profiles for Different Geo-Locations 202B is a set of security regulations such as security algorithm, data encryption rules, sensitive key words, confidential classification rules, etc.

According to at least one implementation, the Location-Based Mobile Object Manager 116A, 116B may also include a User Preferred Mobile Objects Classifier (UPMOC) 204 which is a modular that complies with the predefined rules 202A and regulations 202B to classify a user's mobile objects and data into multiple levels based on different criteria. For example, the UPMOC 204 may be able to classify mobile objects into the following different dimensions: Security criteria: personal and non-personal mobile objects; Frequency criteria: occasionally used, rarely used, and frequently used; recent mobile objects; Content criteria: confidential and un-confidential mobile objects; and Other criteria: project based, line item based, topic based, etc.

Additionally, the Location-Based Mobile Object Manager 116A, 116B may also include a User Geo-Location Detection Agent (UGLDA) 206 which may be one or more real-time modules for geo-location detection and destination prediction. For example, GPS, IP address, smart phone, email, and calendar-based technologies may be used to predict and detect user's geo-location. As such, the UGLDA 206 may be able to monitor a user's geo-location changes and therefore, trigger the Data Transferring Daemon 208. The Data Transferring Daemon (DTD) 208 complies with predefined rules 202A and regulations 202B to transfer the correct mobile objects to a closest server in the user's current geo-location.

Figure 3:
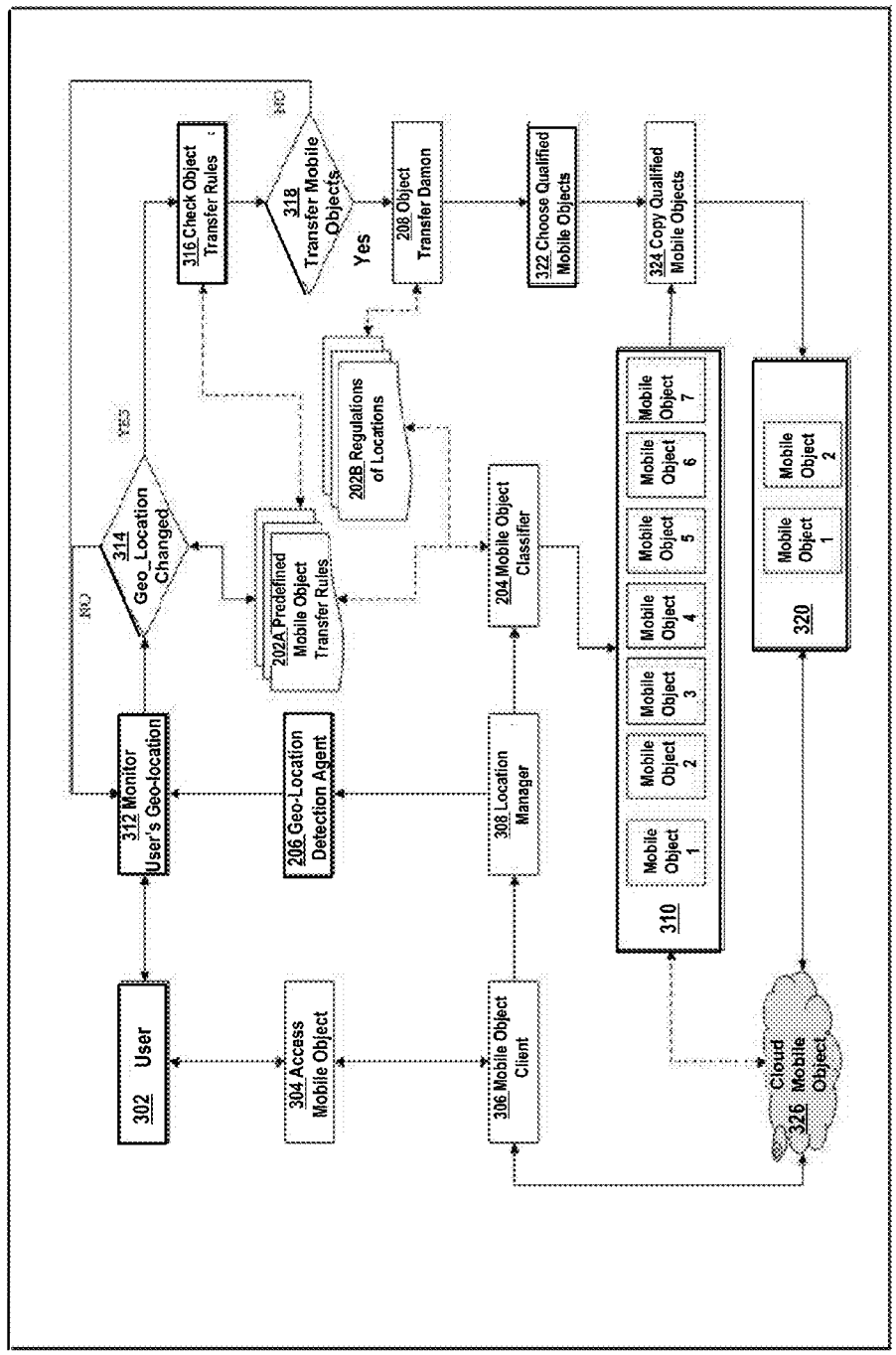
FIG. 3 is an operational flowchart illustrating the steps carried out by a program for managing location-based mobile objects according to at least one embodiment.

Referring now to FIG. 3, an operational flowchart 300 illustrating the steps carried out by a program for managing location-based mobile objects according to at least one embodiment is depicted. As previously described, the present embodiment may automatically transfer the set of service objects 310 (i.e., the user's mobile objects and data) to the closest node in a cloud 326 based on a user's 302 location. As such, the present embodiment may monitor a user's location via a Location Manager 308 and detect, via a Geo-Location detection Agent (i.e., UGLDA) 206 that the user 302 is in a new geo-location. Then, the present embodiment may transfer the user's most recently used mobile objects 310 from a primary server (i.e., a node) in a cloud 326 to a new server (i.e., a closer node) in a cloud 326 based on the user's current location.

Therefore with respect to FIG. 3, a user 302 is able to create and access their mobile objects at 304 via a mobile object client 306. The mobile object client 306 may store a set of service objects 310 (i.e., the user's mobile objects and data) in a cloud based storage repository 326. Then, according to at least one implementation, once the mobile objects account is created, the Location-Based Mobile Object Manager 116A, 116B (FIG. 1) may automatically monitor the geo-location of the user at 312 via a location manager 308. As such, the location manager 308 may monitor the user's Geo-location at 312 and detect via the Geo-Location Detection Agent (UG-LDA) 206 whether the geo-location of the user has changed at 314.

As previously discussed with respect to FIG. 2, the Geo-Location Detection Agent (UGLDA) 206 may be one or more real-time modules for geo-location detection and destination prediction. For example, GPS, IP address, smart phone, email, and calendar-based technologies may be used to predict and detect user's geo-location. As such, the Geo-Location Detection Agent (UGLDA) 206 may be able to monitor a user's geo-location changes and therefore, trigger the Data Transferring Daemon (DTD) 208. The Data Transferring Daemon (DTD) 208 complies with predefined rules (i.e., User's Profile) 202A and regulations (Regulation Profiles for Different Geo-Locations) 202B to transfer the correct mobile objects to a closest server in the user's current geo-location.

If it is determined at 314 that the user's geo-location has not changed, then the Location-Based Mobile Object Manager 116A, 116B (FIG. 1) may continue to monitor the user's geo-location at 312 via the location manager 308. However, if it is determined at 314 that the user's geo-location has changed, then at 318, the data, transaction stage, and programs that are required to run, restore, and continue the mobile object services 310 are analyzed at 316 by the Mobile Object Classifier (UPMOC) 204 in conjunction with the Pre-defined Mobile Object Transfer Rules 202A and Regulations of Locations 202B and packaged (i.e., determined to be transferred at 318 via the Object Transfer Daemon (i.e., Data Transferring Daemon) DTD 208) for a continuous operation in a new node in a cloud 326. Additionally, a copy may also be sent to the master node in the cloud 326 for synchronization. However, if at 318, it is determined that no mobile objects are to be transferred then the method may continue to monitor the user's geo-location at 312.

As previously described, the present embodiment includes a user's predefined mobile object transformation profile 202 (FIG. 2) consisting of Pre-defined Mobile Object Transfer Rules (i.e., User's Profile) 202A and Regulations of Locations (i.e., Regulation Profiles for Different Geo-Locations) 202B, a user geo-location detection agent (UGLDA) 206, a user mobile object classifier (UPMOC) 204, and a mobile object transferring daemon (i.e., Data Transferring Daemon) DTD 208. The Pre-defined Mobile Object transfer Rules 202A is a set of pre-defined rules for user mobile object transformation. The predefined rules may include size, type, frequency usage, confidentiality, content, location sensitivity etc. The Regulations of Locations 202B is a set of security regulations such as security algorithm, data encryption rules, sensitive key words, confidential classification rules, etc.

The Mobile Object Classifier (i.e., User Preferred Mobile Objects Classifier (UPMOC) 204) is a modular that complies with the predefined rules 202A and regulations 202B to classify a user's mobile objects and data into multiple levels based on different criteria. Therefore, the UPMOC 204 may be able to classify mobile objects into different dimensions, such as the following: Security criteria: personal and non-personal mobile objects; Frequency criteria: occasionally used, rarely used, and frequently used; recent mobile objects; Content criteria: confidential and un-confidential mobile objects; and other criteria, such as project based, line item based, topic based, etc.

As such, the user mobile object classifier 204 UPMOC will monitor user mobile object accessing activities and classify mobile objects 320 which will be most likely accessed in the future at step 322 based on the predefined rules 202A and regulations 202B. The user geo-location detection agent (UGLDA) 206 will track user geo-location changes at 314. Therefore, if the user geo-location detection agent (UGLDA) 206 detects the user 302 is close to another mobile object server in a cloud 326, then it will check the object transfer rules at 316. Next at 318, it will trigger the mobile object transferring daemon 208 (DTD) to move (at step 324) the selected mobile objects 322 to a new server in the cloud 326 before the user 302 accesses them. Therefore, a set of service objects will be transferred to the closest node in a cloud based on user's location.

The following is a usage example of the method described with respect to FIG. 3: A user 302, User A, created a mobile objects account with predefined mobile object transferring rules 202A and regulations 202B in the U.S. and configured their important business related mobile objects 310 (such as presentation slides and flash video of products). The UPMOC 204 classified User A's mobile objects and data 310 every day based on User A's preference.

After User A arrived in another country, such as Beijing, for a business trip, UGLDA 206 detected that User A is in a new geo-location, and as such triggers DTD 208 action. The DTD 208 will comply with the predefined mobile object transferring rules 202A and regulations 202B, and will transfer User A's most recent used mobile objects 320 from a primary server in the U.S. 326 to a new server in Beijing 326. As result, User A may present their presentation and share their mobile objects to customers in Beijing without experiencing a large delay or blocks on any mobile object service. As previously discussed, national regulation is a major factor when transferring a mobile object service. For example, the Great Firewall of China may block many internet protocols (IPs) from the U.S., however, it may not block IPs from Europe. As such, the present embodiment may automatically reconfigure user mobile object services and transfer the related object services from the U.S. (or another primary location) to Europe (or another traveled, secondary location) as needed.

It may be appreciated that FIG. 3 provides only an illustration of one implementation and does not imply any limitations with regard to how different embodiments may be implemented. Many modifications to the depicted environments may be made based on design and implementation requirements. For example, the present embodiment may send a copy of the data, transaction stage, and programs that are required to run, restore, and continue the selected mobile object services to the master node in the cloud 326 for synchronization in addition to transferring the set of service object to the closest node in a cloud based on user's location.

Figure 4:
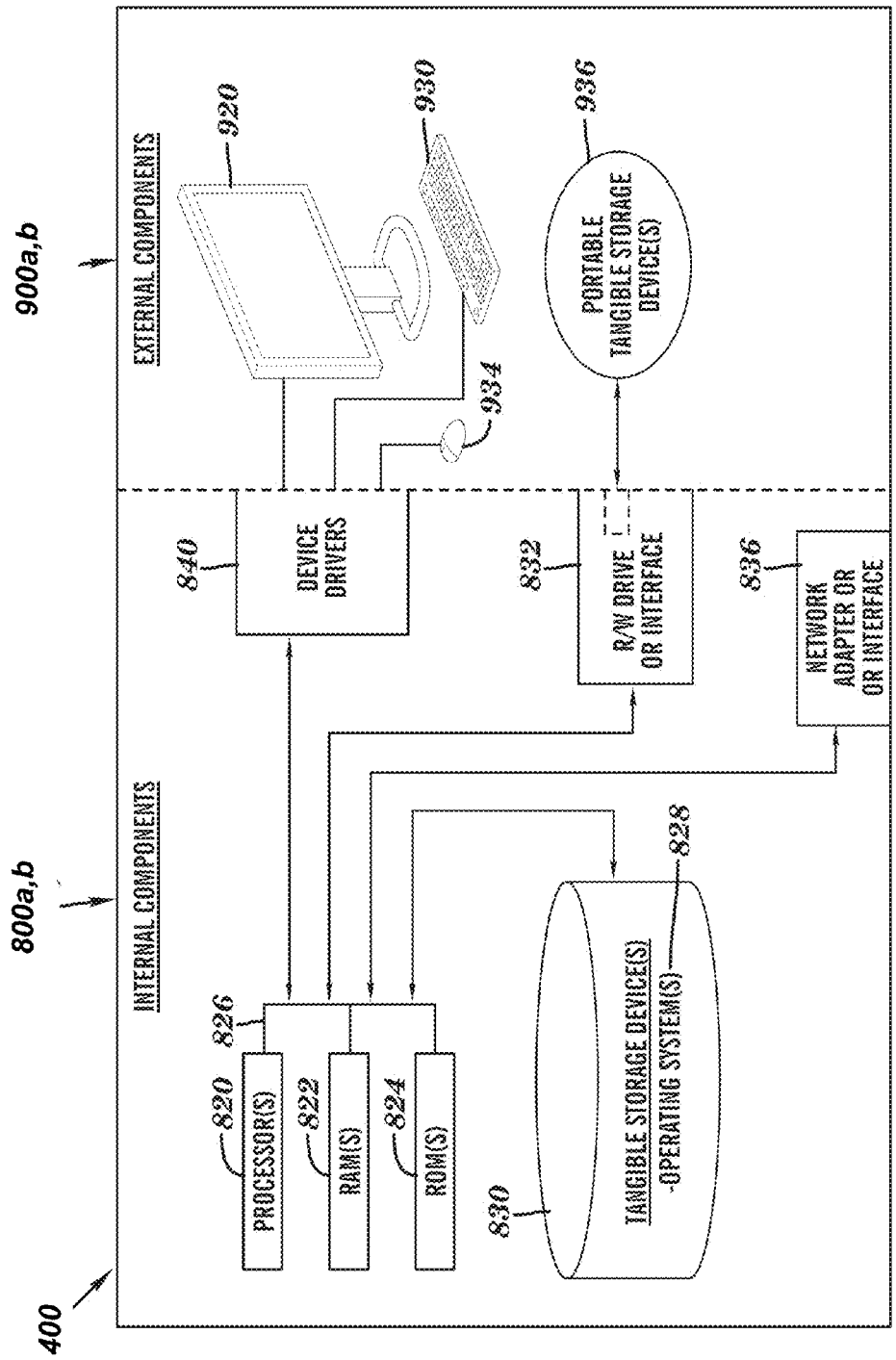
FIG. 4 is a block diagram of internal and external components of computers and servers depicted in FIG. 1 according to at least one embodiment.

FIG. 4 is a block diagram 400 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may be represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1) and network server 114 (FIG. 1) may include respective sets of internal components 800 a,b and external components 900 a,b illustrated in FIG. 4. Each of the sets of internal components 800 include one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and the Software Program 108 (FIG. 1) and the Location-Based Mobile Object Manager 116A (FIG. 1) in client computer 102 (FIG. 1) and the Location-Based Mobile Object Manager 116B (FIG. 1) in network server 114 (FIG. 1) are stored on one or more of the respective computer-readable tangible storage devices 830 for execution by one or more of the respective processors 820 via one or more of the respective RAMs 822 (which typically include cache memory). In the embodiment illustrated in FIG. 4, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 a,b also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as the Software Program 108 (FIG. 1) and the Location-Based Mobile Object Manager 116A, 116B (FIG. 1) can be stored on one or more of the respective portable computer-readable tangible storage devices 936, read via the respective R/W drive or interface 832 and loaded into the respective hard drive 830.

Each set of internal components 800 a,b also includes network adapters or interfaces 836 such as a TCP/IP adapter cards, wireless Wi-Fi interface cards, or 3G or 4G wireless interface cards or other wired or wireless communication links. The Software Program 108 (FIG. 1) and the Location-Based Mobile Object Manager 116A (FIG. 1) in client computer 102 (FIG. 1) and the Location-Based Mobile Object Manager 116B (FIG. 1) in network server 114 (FIG. 1) can be downloaded to client computer 102 (FIG. 1) and network server 114 (FIG. 1) from an external computer via a network (for example, the Internet, a local area network or other, wide area network) and respective network adapters or interfaces 836. From the network adapters or interfaces 836, the Software Program 108 (FIG. 1) and the Location-Based Mobile Object Manager 116A (FIG. 1) in client computer 102 (FIG. 1) and the Location-Based Mobile Object Manager 116B (FIG. 1) in network server 114 (FIG. 1) are loaded into the respective hard drive 830. The network may comprise copper wires, optical fibers, wireless transmission, routers, firewalls, switches, gateway computers and/or edge servers.

Each of the sets of external components 900 a,b can include a computer display monitor 920, a keyboard 930, and a computer mouse 934. External components 900 a,b can also include touch screens, virtual keyboards, touch pads, pointing devices, and other human interface devices. Each of the sets of internal components 800 a,b also includes device drivers 840 to interface to computer display monitor 920, keyboard 930, and computer mouse 934. The device drivers 840, R/W drive or interface 832 and network adapter or interface 836 comprise hardware and software (stored in storage device 830 and/or ROM 824).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
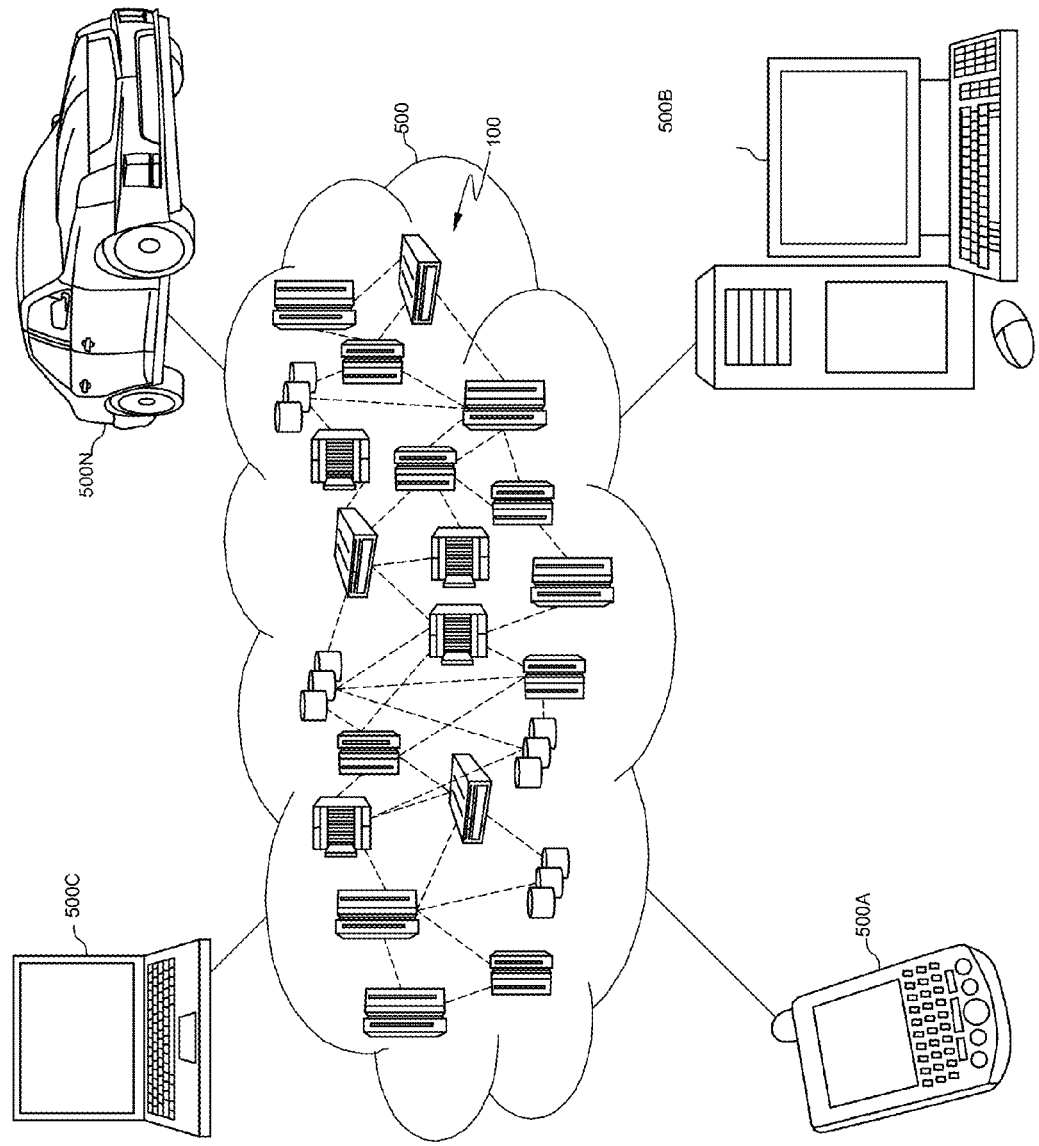
FIG. 5 is a block diagram of an illustrative cloud computing environment including the computer system depicted in FIG. 1, in accordance with an embodiment of the present disclosure.

Referring now to FIG. 5, illustrative cloud computing environment 500 is depicted. As shown, cloud computing environment 500 comprises one or more cloud computing nodes 100 with which local computing devices used by cloud consumers, such as, for example, personal digital assistant (PDA) or cellular telephone 500A, desktop computer 500B, laptop computer 500C, and/or automobile computer system 500N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 500A-N shown in FIG. 5 are intended to be illustrative only and that computing nodes 100 and cloud computing environment 500 can communicate with any type of computerized device over any type of network and/or network addressable connection (e.g., using a web browser).

Figure 6:
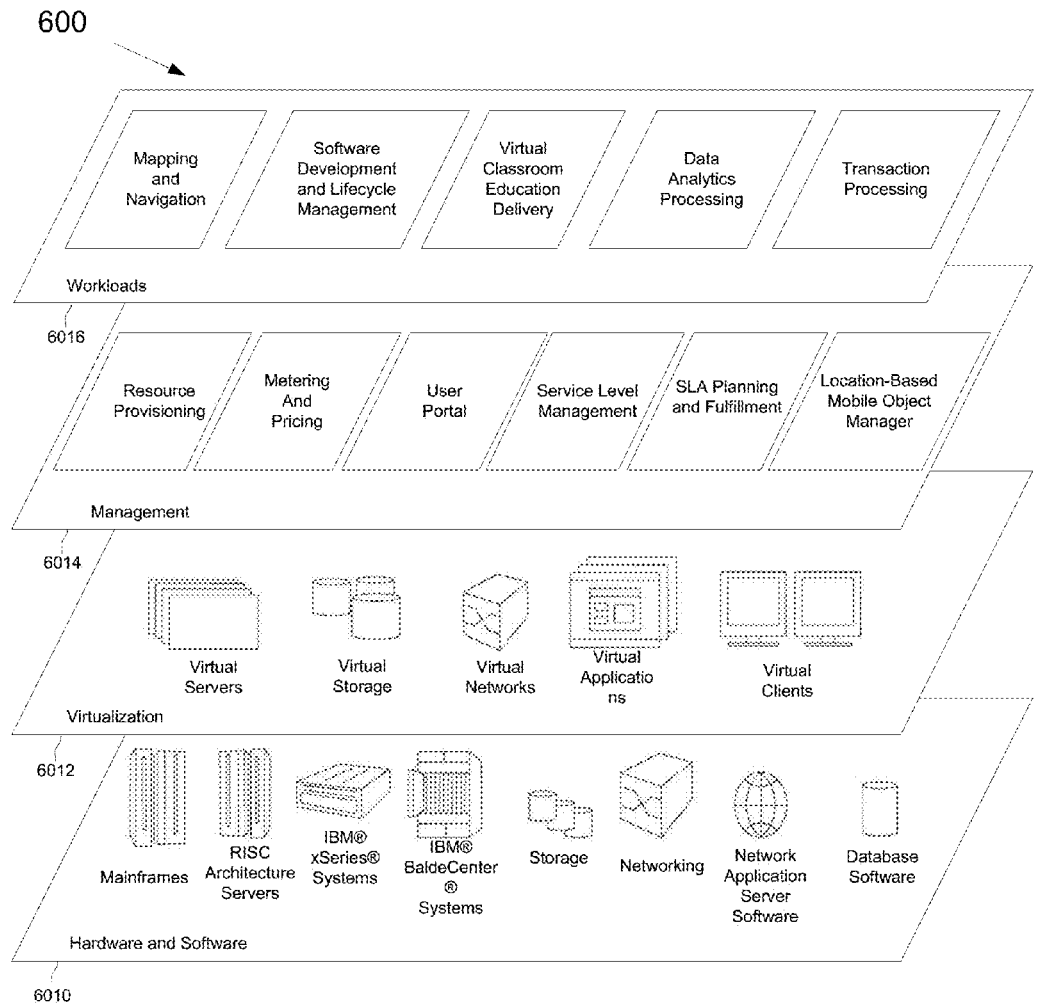
FIG. 6 is a block diagram of functional layers of the illustrative cloud computing environment of FIG. 5, in accordance with an embodiment of the present disclosure.

Referring now to FIG. 6, a set of functional abstraction layers 600 provided by cloud computing environment 500 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 6010 includes hardware and software components. Examples of hardware components include: mainframes; RISC (Reduced Instruction Set Computer) architecture based servers; storage devices; networks and networking components. In some embodiments, software components include network application server software.

Virtualization layer 6012 provides an abstraction layer from which the following examples of virtual entities may be provided: virtual servers; virtual storage; virtual networks, including virtual private networks; virtual applications and operating systems; and virtual clients.

In one example, management layer 6014 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. A Location-Based Mobile Object Manager may manage location-based mobile objects. For example, a Location-Based Mobile Object Manager may detect that a user is in a new geo-location and as such, may transfer the user's most recently used mobile objects from a primary server in one location where the user was initially located to a new server in another location where the user is currently located.

Workloads layer 6016 provides examples of functionality for which the cloud computing environment may be utilized. Examples of workloads and functions which may be provided from this layer include: mapping and navigation; software development and lifecycle management; virtual classroom education delivery; data analytics processing; and transaction processing.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer system for providing location-based service migration, the computer system comprising:

one or more processors, one or more non-transitory computer-readable memories, one or more non-transitory computer-readable tangible storage devices, and program instructions stored on at least one of the one or more storage devices for execution by at least one of the one or more processors via at least one of the one or more memories, wherein the computer system is capable of performing a method comprising:

monitoring a location of a mobile device;
checking the location against a geo-location profile, wherein the geo-location profile comprises at least one of a service, a plurality of migration rules, a plurality of data, an application, a security, and a plurality of access frequency criteria; and
transferring the at least one service and a plurality of data objects used by the at least one service from a first server with a server location outside a bounds for the location to a second server within a bounds for the location in response to automatically detecting a current geo-location associated with the user is closer in proximity to the second server based on the monitoring of the mobile device and in response to detecting a service in the geo-location profile meets a migration criteria, wherein detecting the service in the geo-location profile meets the migration criteria comprises checking the at least one service is in compliance with a plurality of national laws of firewalls associated with the second server, and wherein the transferred at least one service is a determined most recently used service.

2. The computer system of claim 1, wherein the bounds for the second server has a regional bound and rules for the regional bound.

3. The computer system of claim 1, wherein a transaction of the service is migrated seamlessly from the first server to the second server.

4. The computer system of claim 1, wherein the geo-location profile identifies rules allowing tailored options selected from a group of criteria consisting of at least one of a size, a type of frequency usage, a confidentiality, a content, a location sensitivity, a plurality of regulations, a plurality of data encryption rules, a plurality of sensitive key words, and a confidential classification.

5. The computer system of claim 1, wherein the checking the location against a geo-location profile comprises the use of at least one real-time module for geo-location detection and destination prediction.

6. The computer system of claim 5, wherein the at least one real-time module comprises the use of at least one a GPS technology, an IP address, a smartphone technology, an email technology and a calendar-based technology.

7. The computer system of claim 4, wherein the group of criteria further comprises a plurality other criteria consisting of at least one of a project based criteria, a line item based criteria and a topic based criteria.

8. A computer program product for providing location-based service migration, the computer program product comprising:

one or more non-transitory computer-readable storage devices and program instructions stored on at least one of the one or more non-transitory tangible storage devices, the program instructions executable by a processor, the program instructions comprising:
program instructions to monitor a location of a mobile device;
program instructions to check the location against a geo-location profile, wherein the geo-location profile comprises at least one of a service, a plurality of migration rules, a plurality of data, an application, a security, and a plurality of access frequency criteria; and
program instructions to transfer the at least one service and a plurality of data objects used by the at least one service from a first server with a server location outside a bounds for the location to a second server within a bounds for the location in response to automatically detecting a current geo-location associated with the user is closer in proximity to the second server based on the monitoring of the mobile device and in response to detecting a service in the geo-location profile meets a migration criteria, wherein detecting the service in the geo-location profile meets the migration criteria comprises checking the at least one service is in compliance with a plurality of national laws of firewalls associated with the second server, and wherein the transferred at least one service is a determined most recently used service.

9. The computer program product of claim 8, wherein the bounds for the second server has a regional bound and rules for the regional bound.

10. The computer program product of claim 8, wherein a transaction of the service is migrated seamlessly from the first server to the second server.

11. The computer program product of claim 8, wherein the geo-location profile identifies rules allowing tailored options selected from a group of criteria consisting of at least one of a size, a type of frequency usage, a confidentiality, a content, a location sensitivity, a plurality of regulations, a plurality of data encryption rules, a plurality of sensitive key words, and a confidential classification.

12. The computer program product of claim 8, wherein the checking the location against a geo-location profile comprises the use of at least one real-time module for geo-location detection and destination prediction.

13. The computer program product of claim 12, wherein the at least one real-time module comprises the use of at least one a GPS technology, an IP address, a smartphone technology, an email technology and a calendar-based technology.

* * * * *